United States Patent [19]

Bell et al.

[11] 4,037,189
[45] July 19, 1977

[54] METHOD AND APPARATUS FOR DETERMINING THE PROFILE OF AN UNDERWATER PIPELINE

[75] Inventors: Duncan Bell, Stanwood; Jack L. Odell; David E. Olson, both of Everett; Allen E. Peirce, Lynnwood, all of Wash.

[73] Assignee: Western Gear Corporation, Everett, Wash.

[21] Appl. No.: 623,584

[22] Filed: Oct. 20, 1975

[51] Int. Cl.$^2$ .................................................. G01S 5/18
[52] U.S. Cl. ..................................... 340/6 R; 340/3 T
[58] Field of Search .......................... 340/3 T, 3 E, 6 R

[56] References Cited

U.S. PATENT DOCUMENTS

| 3,792,424 | 2/1974 | Nakatsuji et al. | 340/6 R |
|---|---|---|---|
| 3,810,081 | 5/1974 | Rininger | 340/3 T |
| 3,905,007 | 9/1975 | Koesy | 340/3 E |
| 3,953,827 | 4/1976 | Moal et al. | 340/3 T |

*Primary Examiner*—Richard A. Farley
*Attorney, Agent, or Firm*—Seed, Berry, Vernon & Baynham

[57] ABSTRACT

A system for measuring and displaying the side and top profiles of an underwater pipeline as the pipe line is being laid on the sea floor by a pipe laying vessel. The profiles are determined by sequentially measuring the position of points spaced apart along the pipeline with respect to a point on the vessel. The measurements are accomplished by sequentially transmitting an acoustic signal from three, non-colinear transducers. The acoustic signals from each transmission is detected by a plurality of receivers spaced apart along the pipeline. As each receiver detects a transmission it produces an indicating signal on a pair of electrical conductors which are connected to the vessel and all of the receivers on the pipeline. The elapsed time between a transmission from a given transducer and detection of that transmission by each receiver is an indication of the distance between the transducer and each receiver. After all three transducers have interrogated the receivers, the three-dimensional position of each receiver is known, and the pipeline profile as viewed from the top and side can then be platted. Examination of the pipeline profile indicates the stress along the pipe so that the pipeline tension, or barge yaw attitude, can be adjusted to prevent damage to the pipeline.

27 Claims, 9 Drawing Figures

METHOD AND APPARATUS FOR DETERMINING THE PROFILE OF AN UNDERWATER PIPELINE

BACKGROUND OF THE INVENTION

1. Field of the Invention

This invention relates to an underwater pipe laying apparatus and, more particularly, to a system for displaying the profile of a pipeline as it is laid on the sea floor by a surface vessel.

2. Prior Art Relating to the Disclosure

During the construction of an offshore pipeline the pipeline is normally held on a surface vessel, such as a ship or barge, by a machine called a pipe tensioner whose function is to exert a predetermined and relatively constant tension on the pipeline regardless of the motion of the vessel due to sea movement, wind or forward propulsion, in order to prevent the pipeline from being damaged.

During the pipelaying operation, the pipeline generally extends from the stern of the vessel onto a supporting structure called a stinger. The stinger is sloped toward the seabed to provide a support for the pipeline to follow as the pipeline enters the water. From the end of the stinger to the seabed the pipeline follows a modified catenary profile. The exact shape of the profile depends on the pipe stiffness, the depth of the water, the pipeline tension and any underwater currents. Therefore, the pipeline profile from the vessel to the touchdown point on the seabed is unknown.

The characteristic problem of underwater pipe laying operations is that if the pipeline is played out too rapidly, the curved portions of the catenary may become excessively sharp, causing the pipeline to buckle. Although this problem can be alleviated to some degree by using the load of the pipeline on the pipe tensioner as a measure of pipeline tension and keeping this load at a predetermined value, this does not compensate for the friction of the pipeline supporting mechanisms downstream of the pipe tensioner such as on the stinger as well as environmental conditions external to the vessel. By examining the side profile of a pipeline extending between the vessel and the seabed, excessive curves which are likely to cause buckling may be observed and the tension of the pipeline may be accordingly increased to reduce the curvature.

A similar problem may arise with respect to lateral deflections of the pipelaying vessel, since side buckling may occur if the vessel deviates sufficiently from a desired pipeline route. Furthermore, even where the lateral displacement of the vessel is not sufficient to cause side buckling, the pipeline may be unduly lengthened by following a curved path thereby increasing the cost of the pipeline. By examining the top profile of the pipeline, the lateral position and pointing angle of the vessel may be adjusted to prevent side buckling and ensure a straight pipeline path.

As the pipeline passes over the stinger the coating of the pipeline may be damaged, thereby weakening the corrosion protection of the pipeline at localized areas. By examing the top and side profiles of the pipeline these points of potential pipe failure can be determined and corrective measures taken to avoid pipe rupture.

Another disadvantage of conventional pipe laying systems is that since they do not accurately control the position of the pipeline between the vessel and seabed, they require an unduly wide right of way, even when the position of the vessel can be accurately determined by navigational aids.

SUMMARY OF THE INVENTION

It is an object of the invention to provide a system for indicating points of potential pipeline failure resulting from excessive pipeline curvature or damage to the pipeline coating.

It is another object of the invention to provide a system for indicating when corrective action is required to prevent pipeline failure.

It is still another object of this invention to provide a system for accurately positioning an underwater pipeline on the sea floor.

These and other objects of the invention are accomplished by an underwater pipe laying system which sequentially measures the distance between each of three non-linear points on the pipe laying vessel and a plurality of points spaced along the length of the pipeline. The distances are determined by measuring the elapse times between transmission of an acoustic signal and receipt of the transmission by each of a plurality of receivers secured to the pipeline at spaced apart points. Alternatively, the system may utilize receivers positioned at three non-colinear points on the pipe laying vessel for receiving acoustic signals from a plurality of transmitters equally spaced along the length of the pipeline. The distance measurements are then utilized to compute and display pipeline profiles as viewed from the top and side.

DETAILED DESCRIPTION OF THE INVENTION

Figure 1:
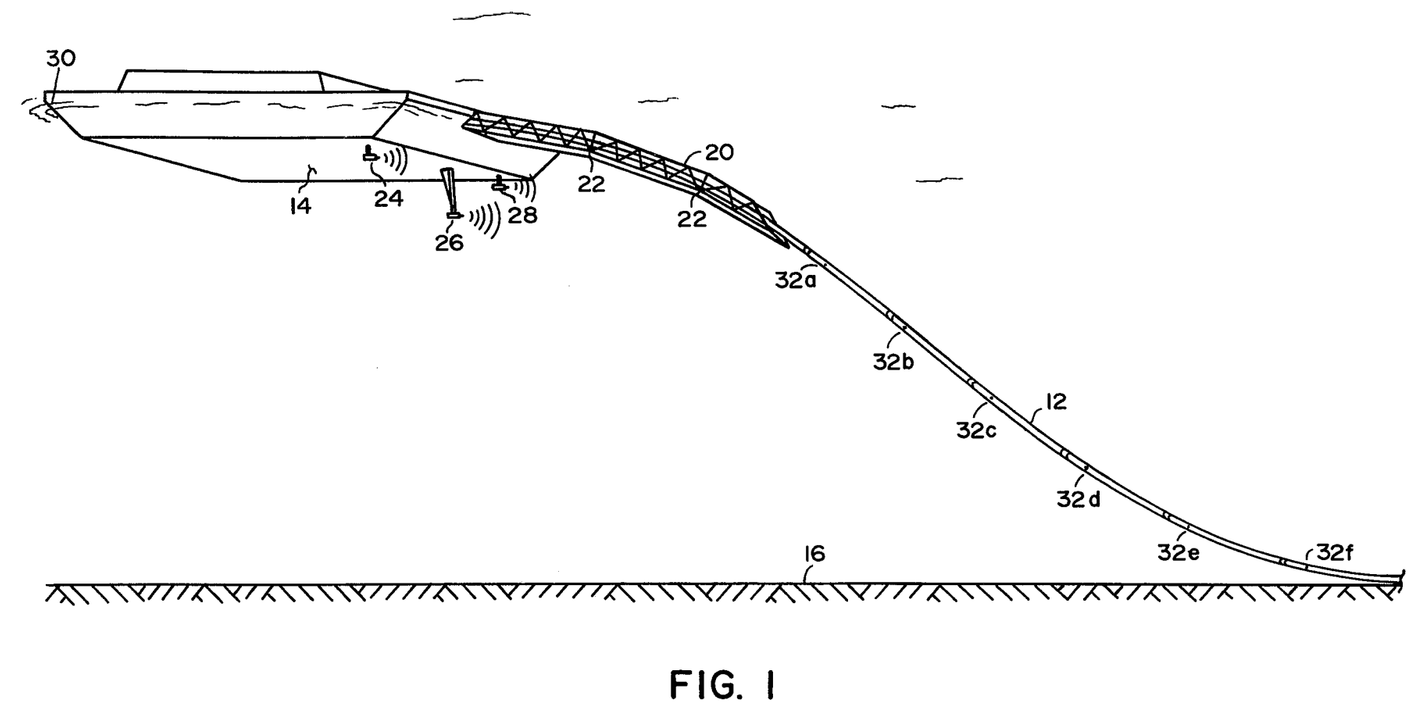
FIG. 1 is an isometric view showing pipeline extending between a pipe laying barge and the ocean floor.
Figure 2:
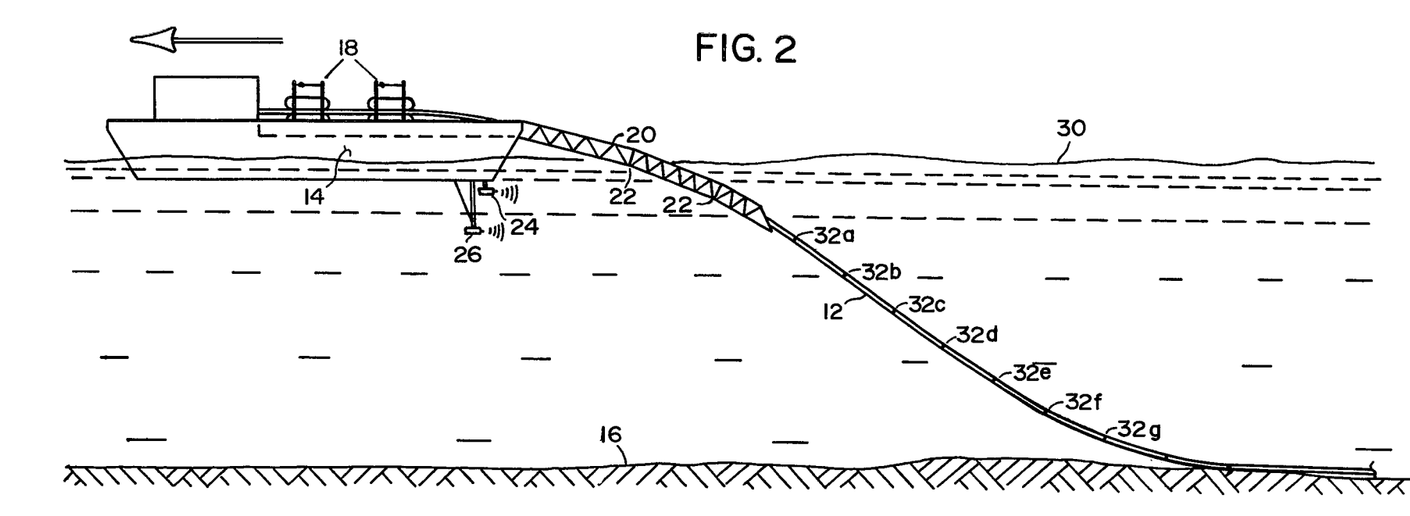
FIG. 2 is a side elevational view of the barge and pipeline of FIG. 1.
Figure 3:
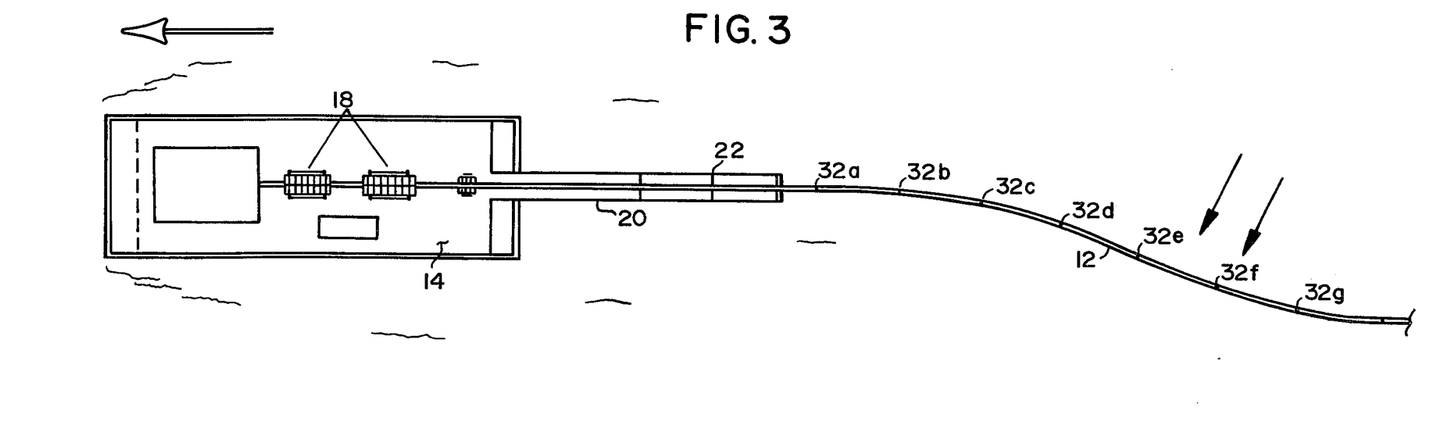
FIG. 3 is a top plan view of the barge and pipeline of FIG. 1.

The system for determining the profile of an underwater pipeline is illustrated in use in FIGS. 1-3. The pipeline 12, formed from a plurality of pipe sections welded end to end, extends from a surface vessel, such as a barge 14, (or from a reel barge method) to the ocean floor in approximately the shape of a catenary. The position of the pipeline 12 with respect to the barge 14 is controlled by tensioner unit 18 which securely grips the pipeline and selectively plays out or retracts the pipeline from the barge. One type of pipe tensioning unit is described in U.S. Pat. No. 3,669,329 incorporated herein by reference, although other units performing similar functions may also be used. By adjusting the position of the pipeline 12 with respect to the barge 14, the tensioner 18 maintains the pipeline 12 in substantially constant tension so that motion of the barge 14 due to sea movement does not cause damage to the pipeline.

The pipeline 12 extends from the stern of the barge 14 over a stinger 20 which may be rigid, or articulated as at 22, and slopes toward the ocean floor 16 to provide a low stress profile for the pipeline 12 to follow. However, despite the low stress profile, the weight of the pipeline on the stinger may result in damage to the pipeline coating which is generally concrete. Although the shape of the pipeline 12 from the stinger 20 to the ocean floor 16 is a modified catenary, the exact shape of the profile depends upon the pipe stiffness, the water depth, the pipeline tension and any underwater currents. Thus, as illustrated in FIG. 2, insufficient tension may cause excessive bending at the curved portion of the pipeline, and, as illustrated in FIG. 3, an underwater current transverse to the path of the pipeline 21 may cause the pipeline 12 to deflect to one side. Excessive curvature of the pipeline 12, either vertically or horizontally, damages the pipeline coating and may cause the pipeline 12 to buckle. For this reason it is important to be able to determine the exact shape of the pipeline 12 at all points from the barge 14 to the ocean floor 16.

In one embodiment of the invention three transducers 24, 26 and 28 are secured to the barge 14 at three spaced-apart, non-colinear points beneath the water surface. These transducers are connected to individual transmitters which are adapted to selectively supply a signal so that the transducers propagate an acoustic signal. A plurality of receivers 32 are secured to the pipeline at spaced-apart points along its length and are connected in parallel by common electrical conductors extending along the pipeline to the barge 14. The spacing between the receivers determines the resolution of the system, and a smaller inter-receiver spacing will be required to achieve sufficient resolution to detect pipeline bends having a smaller radius of curvature. The minimum bending radius before buckling will vary with the characteristics of the pipeline and the ocean, and will be a function of such parameters as pipeline diameter and water depth.

The distance from each transducer 24, 26, 28 to each receiver 32 is measured by individually actuating each transmitter and measuring the elapse time from transmission of the acoustic signal to detection of the signal by each receiver 32. The first transmission is through transducer 24 and the receivers 32 produce an acknowledgment signal on the common conductors upon detection of the acoustic signal. Since the acknowledgement signals from the receivers occur in the sequence that the receivers detect the acoustic signal, and this sequence corresponds to the distances between the transducer and the receivers, the acknowledgment signals are received in the order that the receivers are secured to the pipeline 12. After acknowledgment signals have been received from all the receivers 32 responsive to the acoustic signal from transducer 24, a second acoustic signal is transmitted through transducer 26 and the elapsed times from transmission of that acoustic signal to receipt of the acknowledgment signals responsive to detection of the signal by the receivers are measured. Finally, the same procedure is repeated with respect to transducer 28.

An on-board computer (not shown) calculates a distance corresponding to the elapsed transit time of the acoustic signals from the transducers 24, 26, 28 to the receivers 32. The distance measurements from the transducers 24, 28 are processed by the onboard computer to generate a visual indication of the pipeline profile as viewed from the top and as illustrated in FIG. 3. The distance measurements from the transducer 26 to the receivers 32 are then also processed to generate a visual indication of the pipeline profile as viewed from the side and as illustrated in FIG. 2.

In an alternative embodiment of the system the receivers 32 are replaced by transmitters and the transducers 24, 26, 28 are connected to receivers instead of transmitters. All of the transmitters are simultaneously excited and each receiver-transducer 24, 26, 28 is sequentially enabled to calculate the distance between each of the transmitters and the receiver-transducers. The distance measurements are processed in the same manner as in the first embodiment to generate side and top pipeline profiles.

Figure 4:
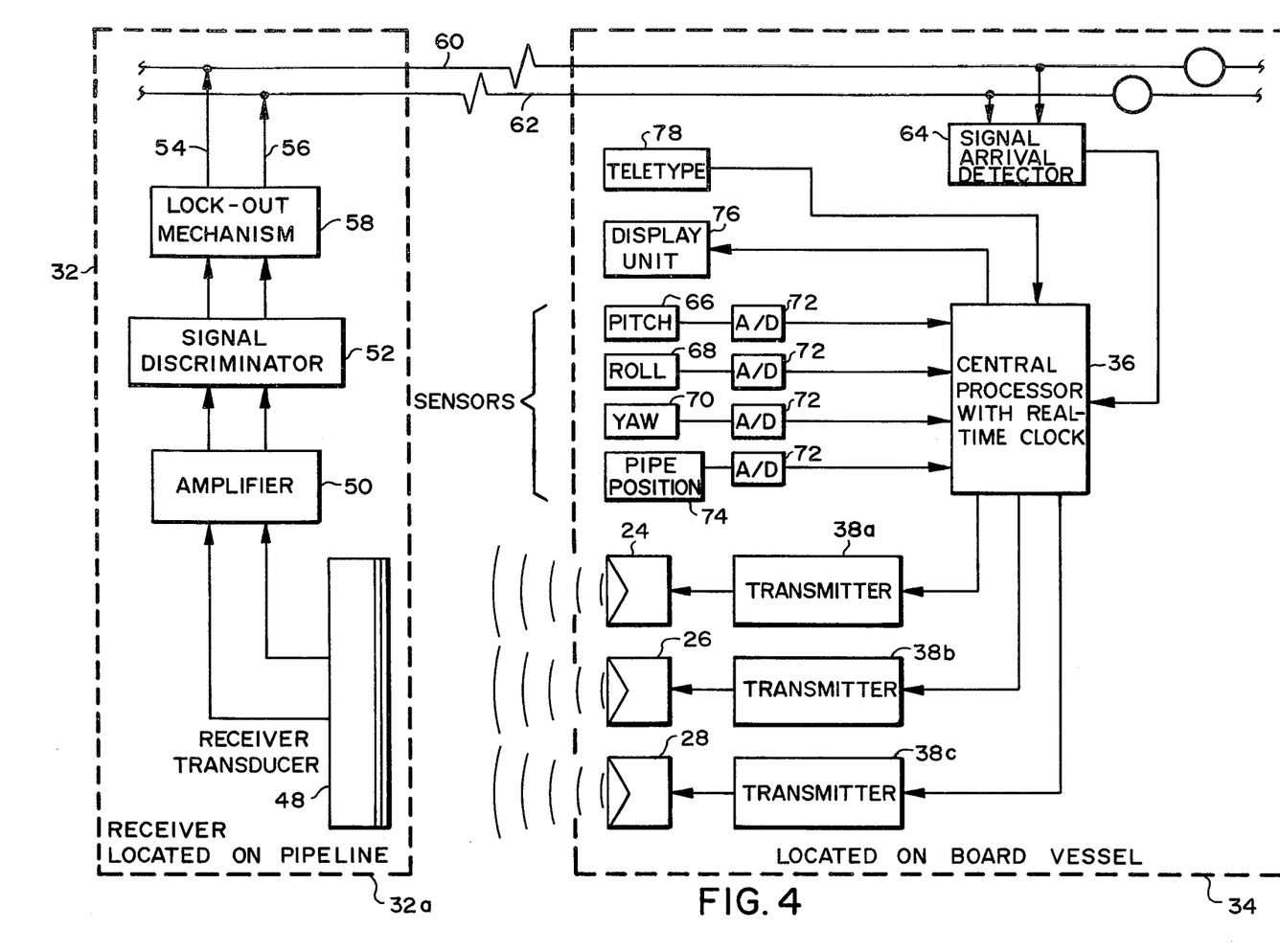
FIG. 4 is a block diagram of the overall system.

A block diagram illustrating the components of the system is shown in FIG. 4. The operation of the system 34 located on the vessel 14 is controlled by a central processor 36 which is a relatively small, general purpose digital computer, such as a NOVA 2/10 manufactured by Data General, Inc., which also contains a real time clock and systems for interfacing with the remaining components of the system. The central processer 36 sequentially provides trigger signals to the transmitters 38a, b, c which then drive transducers 24, 26, 28, respectively, so that the transducers propagate acoustic signals. Although the frequency and characteristics of the acoustic signals are not critical, in one operational embodiment of the invention the acoustic signal is a 50 KHz tone burst having a width of at least 100 microseconds.

Figure 5:
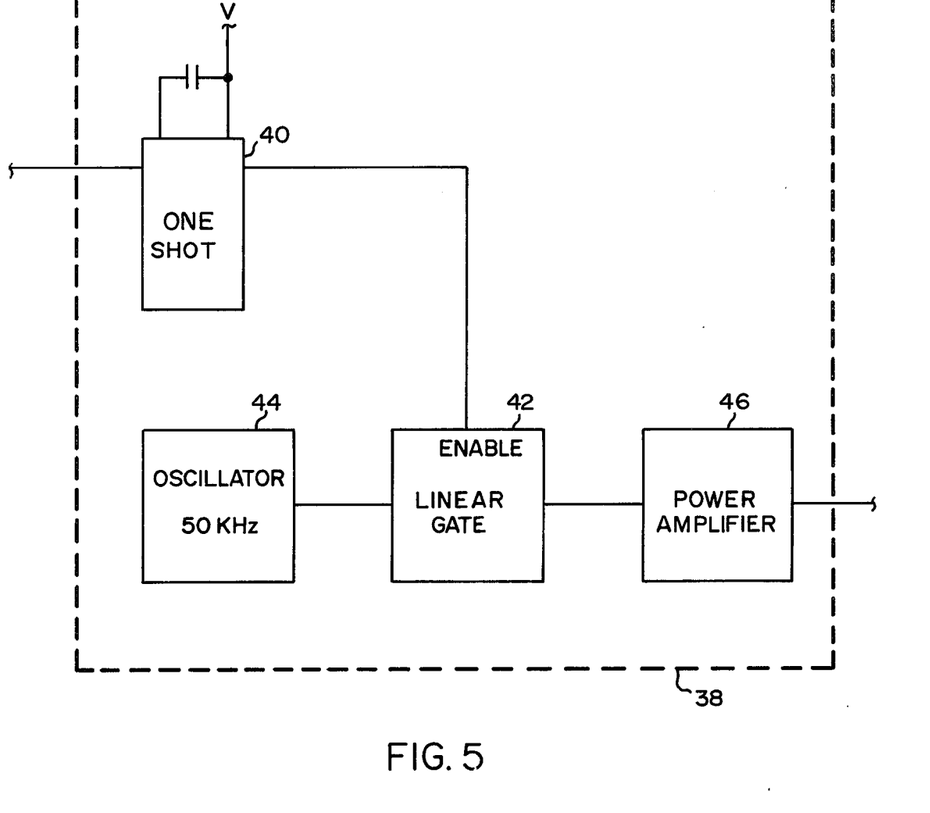
FIG. 5 is a block diagram of a transmitter unit.

A block diagram of the transmitter 38 is illustrated in FIG. 5. It includes a one-shot 40 which receives the trigger signal from the central processor 36 and generates a pulse having a predetermined width. The pulse from the output of the one-shot 40 enables a linear gate 42 so that the output of a 50 KHz, continuously running oscillator 44, is gated to the input of a power amplifier 46. The linear gate 42 is conventional and may be formed using an FET mixer. The power amplifier 46 is connected directly to one of the transmitting transducers 24, 26, 28 which propagate the 50 KHz signal in a somewhat focused beam toward the pipeline.

When the acoustic signal reaches the receiver 32a it produces a low level voltage at the output of receiver-transducer 48 which is amplified by a narrow band amplifier 50 and fed to a signal discriminator 52. The signal discriminator 52 prevents the receiver from responding to extraneous signals not originating at one of the transducers 24, 26, 28. When the signal discriminator 52 receives an acoustic signal having the proper characteristics indicative of an acoustic signal transmitted from one of the transducers 24, 26, 28, it generates an acknowledgment signal on conductors 54, 56 at the output of a lockout mechanism 58 and triggers the lockout mechanism 58 to prevent the receiver from generating additional acknowledgment signals responsive to detection of delayed acoustic signals which either travel indirectly to the receiver transducer or from one of the transmitter-transducers 24, 26, 28 or reflect off underwater objects. The wires 54, 56 are connected to a pair of conductors 60, 62 extending along the pipeline and connected to all of the other receivers 32.

In an alternative embodiment the conductors 60, 62 may be replaced by an acoustic link for conducting acknowledgment signals to the vessel 14. In this embodiment the output of the signal discriminator 52 triggers an acoustic transmitter operating at a different frequency than transmitter 38. The acoustic acknowledgment signal is then detected by a receiver transducer on the vessel 14. The elapsed time for a given distance in this embodiment is roughly twice that of the common conductor embodiment.

The acknowledgment signals from all the receivers 32 are conveyed to the vessel 14. A signal arrival detector 64 processes the acknowledgment signals and indicates their presence to the central processor 36. The elapsed times between receipt of the trigger signal by the transmitter 38a and detection of the acknowledgment signals by the signal arrival detector 64 with respect to the receivers 32 are measured by the central processor 36 which computes a first set of distance measurements corresponding to the distances between the transducer 24 and the receivers 32. After the first set of distance measurements has been computed the central processor 36 sends a trigger signal to the transmitter 38b which causes transducer 26 to propagate an acoustic signal to the receivers 32 for computing a second set of distance measurements corresponding to the distance between the transducer 26 and each of the receivers 32 spaced apart along the length of the pipeline. Finally, a third trigger signal from the central processor 36 actuates the transmitter 38c thereby producing an acoustic signal from transducer 28 so that the central processor 36 computes a third set of distance measurements corresponding to the distance between the transducer 28 and each of the receivers 32.

After all of the distances between each transducer 24, 26, 28 and all of the receivers 32 are known, the central processor 36 computes the pipeline profile with respect to the vessel 14 as viewed from the top and side. Since the software for performing this computation is well known in the art it is not described in detail herein. The software is merely a straightforward implementation of conventional geometric formulae for determining the distance between two points spaced apart in three dimensions.

In order to display the profile of the pipeline with respect to a fixed frame of reference, the pipeline profile with respect to the vessel 14 is modified by measurements corresponding to the position of the vessel with respect to a fixed frame of reference. For this purpose pitch, roll and yaw sensors 66, 68, 70, respectively, are fed to the central processor 36 through analog to digital converters 72 so that the central processor 36 can compute the side and top profiles of the pipeline with respect to a fixed frame of reference. A pipe position sensor 74 detects the position of the pipeline with respect to the vessel 14 and feeds these data to the central processor 36 to modify the pipeline profiles in accordance with variations in the relative position between the pipeline and the vessel between successive interrogations.

After the central processor 36 computes the side and top profiles of the pipeline the data are converted to proper form and sent to a display unit 76 such as a conventional CRT display. A teletype 78 is connected to the central processor 36 for accessing the central processor software and for entering data into the central processor 36. The above receiver interrogation procedure is repeated at a predetermined rate to plot new pipeline profiles as the position of the pipeline varies with time. The repitition rate of the interrogation procedure will depend upon the rate at which the pipeline position varies and the accuracy required between interrogations.

An alternative embodiment of the system utilizing several transmitters spaced apart along the length of the pipeline operates in a substantially similar manner. A trigger signal is conveyed to all of the transmitters through common conductors 60, 62 extending along the length of the pipeline. In response to the trigger signal all of the transmitters on the pipeline simultaneously generate an acoustic signal. The elapsed times between transmission of the acoustic signals and receipt of these signals by three spaced-apart, non-linear receiver-transducers are measured to provide three sets of distance measurements corresponding to the distances between each of the receiver-transducers and all of the transmitters.

As a further modification, the trigger signal can be conveyed to the transmitters via an acoustic link instead of using the common conductors 60, 62. In this embodiment a transmitter operating at a frequency other than the frequency of the transmitters on the pipeline transmits an acoustic trigger signal to all of the pipeline transmitters. The acoustic trigger signal is detected by receivers in the pipeline transmitters which are tuned to the frequency of the initiate signal. The distance measurements are then computed as in the previously described system, except that the elapsed time measurements are aproximately twice as great as those measurements where the trigger signal is sent via common conductors 60, 62.

Figure 6:
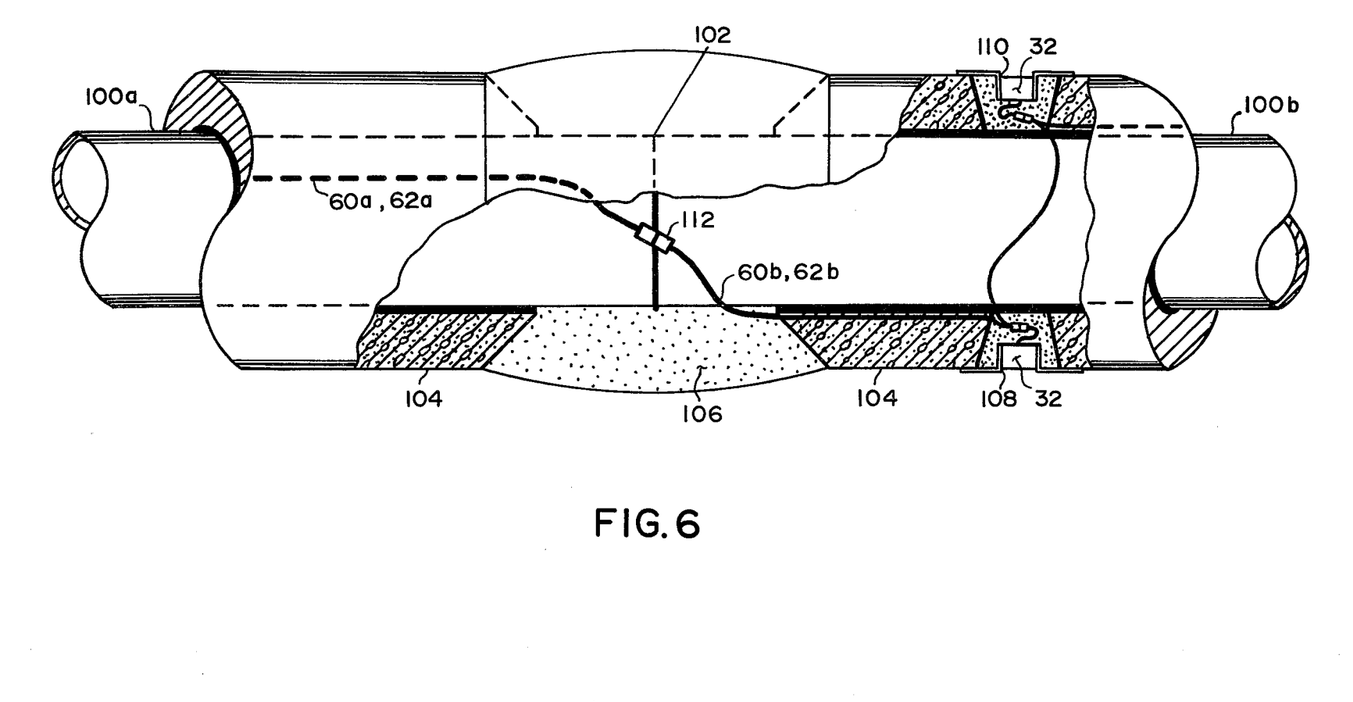
FIG. 6 is a fragmented view showing the manner in which the receivers are secured to the pipeline.

The manner in which the receivers or transmitter are secured to the pipeline is illustrated in FIG. 6. The pipeline includes lengths of metal pipe 100a, b welded to each other at 102. Before being placed aboard the pipe laying vessel, the pipes 100 are pre-coated by a coating 104, such as concrete, along their entire length except for a small area adjacent their ends to allow access to the ends for welding on board the vessel. After the pipes 100a, b are welded to each other, the exposed area of the pipe 100 adjacent the weld 102 is filled with a protective substance such as bitumen which melts at about 450° F. A pair of recesses 108, 110 are formed in the coating 104 at diametrically opposed points spaced apart aong the length of the pipeline. Receivers 32 are inserted into the recesses 108, 110 and are connected to the conductors 60, 62 which are beneath the coating 104 and accessible at the recesses 108, 110. Electrical contact between the conductors 60a, 62a of one pipe 100a and the conductors 60b, 62b of another pipe 100b is made by a connector 112 which is provided, adjacent the joined ends of the pipes so as to be accessible before the protective coating 106 has been placed around the weld 102.

The recesses 108, 110 are placed at diametrically opposed points so that at least one of the recesses will be acoustically visible to the transducers 24, 26, 28 at all times. A single recess might be acoustically shadowed by the pipeline when the recess was facing away from the vessel or when the recess was lying on the sea floor. Alternatively, the transmitters or receivers may be imbedded in the bitumen adjacent the pipe joints. However, the high temperature of the bitumen may require the receivers or transmitters to be insulated or special electronic designs may be required.

Figure 7:
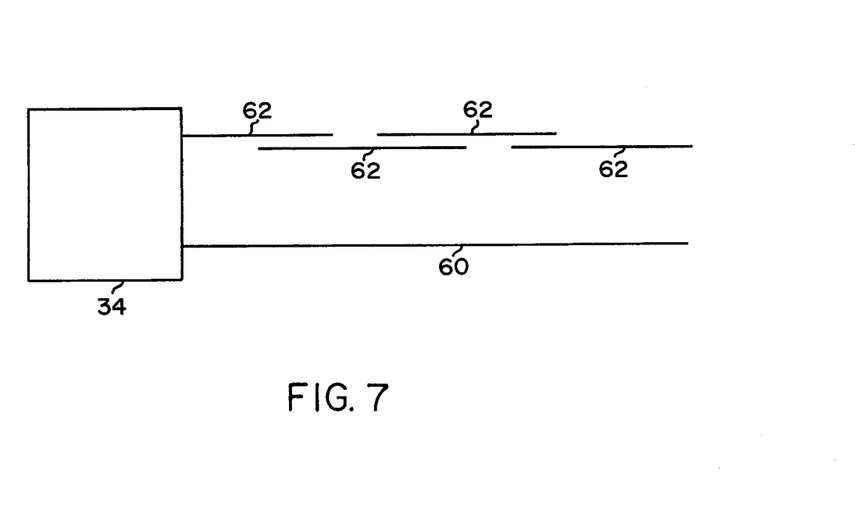
FIG. 7 is a schematic illustrating a circuit for connecting the pipeline receiver or transmitter units in order to provide distance discrimination.

In order to provide range discrimination to prevent measurements from receivers or transmitters a substantial distance from vessel, the conductors can be staggered as illustrated in FIG. 7. As the pipeline is played out successive lengths of overlapping conductors 62 are disconnected from the vessel electronics 34 so that electrical communication with receivers or transmitters connected between conductors 60 and 62 is terminated except for those receivers or transmitters connected to the conductor 62 closest to the vessel.

Figure 8A:
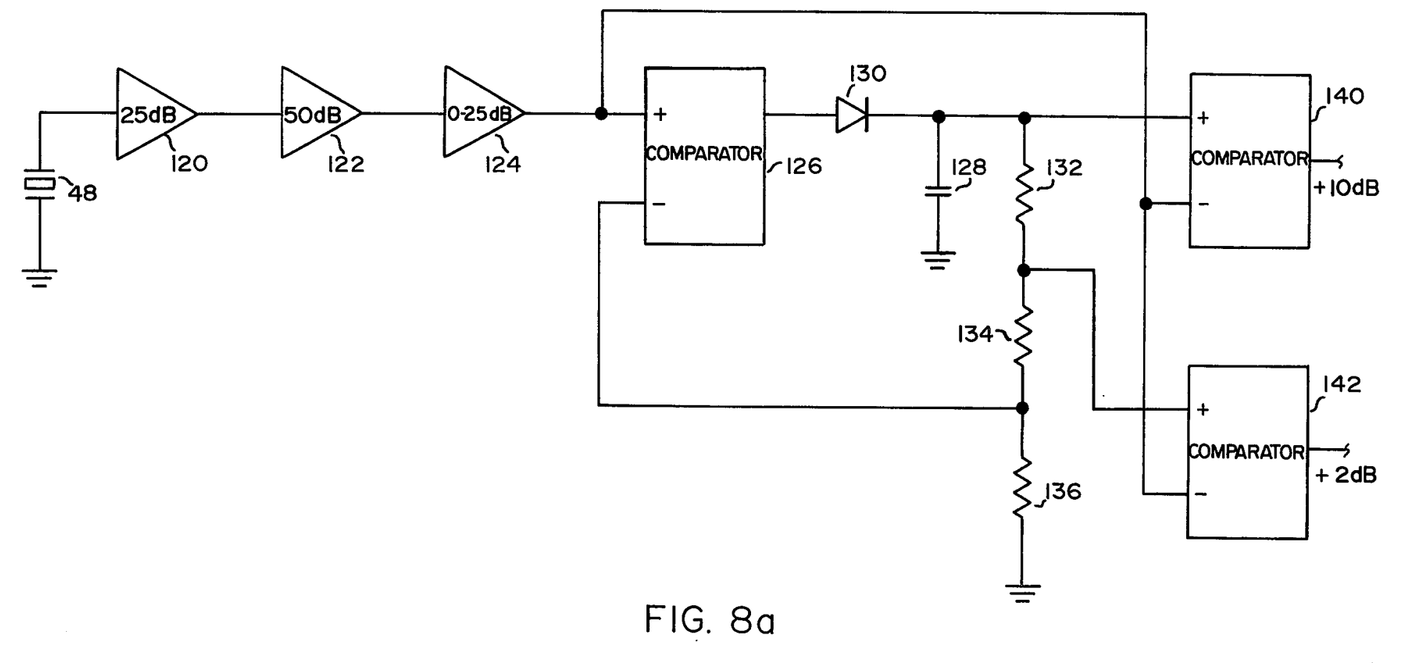
FIGS. 8a and 8b is a schematic of the receiver electronics which may be secured to the pipeline and interrogated by transmitters on the pipe laying vessel.

A schematic of the receiver electronics is illustrated in FIG. 8. The acoustic signal is detected by a transducer 48 such as a piezoelectric crystal. The low level signal at the output of the transducer 48 is amplified by a high gain, relatively wide band amplifier 120 which boosts the signal about 25 dB and delivers it to a narrow band amplifier 122 having a band pass frequency of 50 KHz and a center frequency gain of about 50 dB. The output of the band pass amplifier 122 is further amplified by a variable gain, broad band amplifier 124 which allows adjustment of the sytem to compensate for variations in system parameters and environmental conditions. The amplifiers 120, 122, 124 are well known in the art, and may be conventional high gain differential amplifiers such as the RCA CA 3100 in combination with a conventional passive network of resistors and capacitors.

The output of the amplifier 124 is connected to a comparator 126 such as an LM 311 which generates a constant positive voltage at the output for a positive voltage comparison at the input, and zero volts at the output for a negative voltage comparison at the input. The comparitor charges capacitor 128 through diode 130 to its peak output voltage, and the capacitor 128 is maintained at this voltage for a time since reductions in voltage at the output of comparitor 126 back-bias diode 130. The voltage across the capacitor 128 also appears across a voltage divider formed by resistors 132, 134, and 136. Because of the relatively large time constant of the capacitor 128 in combination with the series resistance of resistors 132, 134, 136, the voltage across the voltage divider is relatively constant.

Since the comparator 126 has a relatively low output impedance it quickly charges the capacitor 128 until the voltage at the junction between resistors 134 and 136 is greater than the output of amplifier 124. At this point the voltage at the output of comparitor 126 drops to zero volts but the capacitor 128 remains charged a voltage such that the voltage fed to the negative comparison input of comparitor 126 is substantially equal to the peak voltage at the output of amplifier 124. Before the receiver detects an acoustic signal only a noise signal is present at the output of amplifier 124. Thus the voltage at the junction between resistors 134 and 136 is a relatively constant voltage equal to the peak noise level at the output of amplifier 124. The divider ratio between resistors 136 and 134 is such that the voltage at the junction between resistors 132 and 134 is 2 dB higher than the peak noise voltage at the junction between resistors 134 and 163. Similarly, the divider ratio between the resistors 132, 134 and 136 is such that the voltage across the capacitor 128 is 10 dB higher than the peak noise voltage at the junction between resistors 134 and 136. The circuit thus establishes voltage levels correspondng to ambient conditions so that the receiver does not respond to signals which are not significantly greater in amplitude than the noise or which are not transmitted from the transducers on the vessel.

The amplified, 50 KHz acoustic signal at the output of amplifier 124 is compared to the 2 dB noise reference and the 10 dB noise reference by comparators 140, 142, respectively. Thus, as soon as the amplified acoustic signal exceeds the peak noise level by 2 dB, a 50 KHz square wave is generated at the output of comparator 142. Similarly, as the amplified acoustic signal exceeds the peak noise level by 10 dB a 50 KHz square wave is produced at the output of comparator 140. The +2 dB and +10 dB signals are sent to a signal discriminator (FIG. 8B) which recognizes signals transmitted from the transducers in the vessel. The +2 db signal is fed to NAND gate 144 which is initially enabled by a 1 at the output of inverter 146. The output of NAND gate 144 triggers a one-shot 148 which generates a 25 microsecond pulse. One-shot 148 is retriggerable so that its output remains at a high or logic 1 level for 25 microseconds after each leading edge at its input.

Figure 8B:
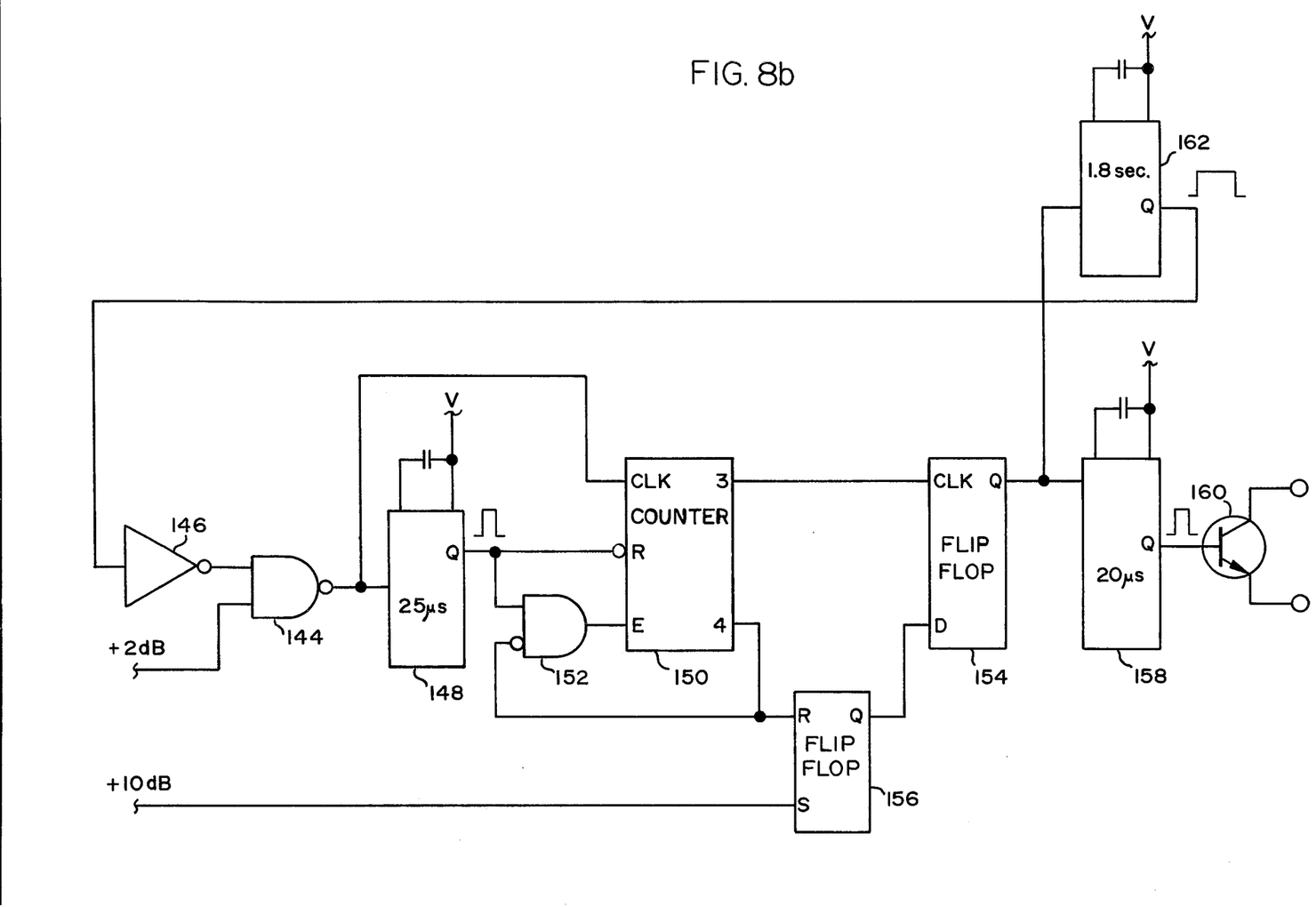

Since the output of NAND gate 144 is a 50 KHz square wave, there is a leading edge every 20 microseconds. Because the pulse width at the output of one-shot 148 is 25 microseconds, the output remains at a high level as long as the 50 KHz square wave is present at the output of NAND gate 144. The Q output of the retriggerable one-shot 148 is connected to the low level reset terminal of a counter 150 so that when the +2 dB signal terminates and the output of one-shot 148 drops to a low or logic 0 level, counter 150 is reset. When the output of one-shot 148 is at a high level, counter 150 is enabled through AND gate 152. The 50 KHz square wave at the output of NAND gate 144 is connected to the clock input of counter 150, thereby incrementing the counter once every cycle of the 50 KHz acoustic signal.

On the leading edge of the three count the counter 150 produces a pulse at its 3 output which clocks the voltage level at the data input of flip-flop 154 to the Q output of flip-flop 154. The data input to flip-flop 154 is connected to the Q output of set-reset flip-flop 156 which is reset on the 4 count of counter 150 and set by the leading edge of the first +10 dB pulse from comparator 140. If the acoustic signal at the output of amplifier 124 has reached a peak value of 10 dB above the peak noise level before the third cycle of an acoustic signal having an amplitude at least 2 dB greater than the peak noise level, the Q output of flip-flop 154 rises to a high or logic 1 level on the three count.

On the four count of counter 150 the 4 output of the counter rises to a high level thereby resetting set-reset flip-flop 156 and disabling counter 150 through AND gate 152 so that the counter remains at the four count. As long as the 2 dB signal is present, the output of retriggerable one-shot 148 remains at 1 and the counter 150 remains disabled. The output of flip-flop 154 triggers a 20 microsecond one-shot 158 which saturates transistor 160 to produce an acknowledgement signal at the receiver output connected between the emitter and collector of transistor 160.

In summary, the third cycle of the 2 dB signal establishes a window at which time the discriminator circuit examines whether the +10 dB signal is present. If the +10 dB signal is present during the window, an acknowledgment signal is generated. The acknowledgment signal at the Q output of flip-flop 154 also triggers a lockout one-shot 162 which disables the retriggerable one-shot 148 for 1.8 seconds through inverter 146 and NAND gate 144. The lockout one-shot 162 prevents the receiver electronics from responding to delayed acoustic signals such as those which arrive indirectly from the transducers or which reflect off underwater objects. The 1.8 second lockout signal, by disabling retriggerable one-shot 148, causes the output of one-shot 148 to drop to logic 0 thus resetting the counter 150 so that at the end of 1.8 seconds the receiver is once again able to respond to acoustic signals propagated by one of the other transducers.

In the alternative embodiment of the system in which transmitters are placed at spaced-apart points along the pipeline and the receivers are mounted on the vessel, a substantially similar system would be used for the receiver electronics on the vessel.

The pipeline profiles allow the operator of the pipelaying equipment to detect a bending radius below a critical value so that he can make adjustments to prevent damage to the pipeline. The top profile reveals whether or not the vessel is laterally offset from the pipeline path or is pointing in the same direction as the pipeline thus allowing the operator to correct the position and orientation of the vessel to prevent side buckling. The side profile reveals whether or not the tension on the pipeline is correct thus allowing the operator to modify the force exerted on the pipeline by the tensioner. If desired, the central processor may automatically analyze the data to detect a bending radius below a critical value using conventional mathematical techniques such as by using the second derivatives of the pipeline profiles. A signal can then be generated for automatically controlling the pipe tensioner and the vessel propulsion system so that a predetermined bending radius is maintained. The top profile also verifies the location of the pipeline on the sea floor to ensure that it is within the right-of-way.

The embodiments of the invention in which a particular property or privilege is claimed are defined as follows:

1. A method for providing an indication of the position of an underwater pipeline extending from a pipe laying vessel to an ocean with respect to a reference plane equidistant from first and second spaced apart reference points, said method comprising:
   providing first and second acoustic transmitter means at said first and second reference points, respectively, for selectively transmitting respective acoustic signals, said reference points being fixedly located with respect to said vessel beneath the water surface;
   securing a plurality of acoustic receiver means to said pipeline at spaced-apart points along the length thereof for generating respective acknowledgement signals responsive to detection of such an acoustic signal by each of said receivers;
   providing a common information link between said receiver means and said vessel for conveying said acknowledgment signals from said receiver means to said vessel, said information link being an electrical conductor extending between said vessel and all of said receiver means;
   actuating said first transmitter means;
   measuring the elapsed times from transmission of said acoustic signal from said first transmitter means to receipt of acknowledgment signals through said information link from each of said receiver means;
   calculating the distance from said first transmitter means to each of said receiver means corresponding to each of said elapsed time measurements;
   actuating said second transmitter means;
   measuring the elapsed times from transmission of said acoustic signal from said second transmitter means to receipt of acknowledgment signals through said information link from each of said receiver means;
   calculating the distance from said second transmitter means to each of said receiver means corresponding to each of said elapsed time measurements; and
   processing said distance calculations to provide a visual indication of the position of said pipeline with respect to said reference plane.

2. The method of claim 1, including the further step of analyzing the characteristics of acoustic signals received at said receiver means such that said receiver means generate an acknowledgment signal only in response to received acoustic signals having a predefined characteristic related to the acoustic signal transmitted from the vessel.

3. The method of claim 2, wherein said predefined characteristic is an increase in amplitude of said acoustic signal within a predetermined period of time.

4. The method of claim 1, including the further step of disabling each receiver means for a predetermined period after it generates an acknowledgment signal whereby the receiver means is incapable of responding to delayed acoustic signals.

5. The method of claim 1, wherein said step of processing said distance measurements includes the step of modifying distance measurements to compensate for the relative motion between said vessel and said pipeline such that said pipeline profile is stationary with respect to a fixed plane of reference.

6. The method of claim 1, wherein said pipeline is surrounded by a coating and said electrical conductor extends along said pipeline beneath the outer surface of said coating.

7. The method of claim 6, further including the steps of securing a plurality of overlapping conductors staggered along the length of said pipeline to function one at a time as one of said pair of conductors and connecting the overlapped portions of said staggered conductors to those acoustic receiver means located at the overlap, thereby preventing acknowledgment signals from being received from those of the receiver means located a distance from the vessel greater than the length of the adjoining staggered conductor.

8. A method for providing an indication of the position of an underwater pipeline extending from a pipe laying vessel to an ocean floor with respect to a reference plane equidistant from first and second spaced apart reference points, said method comprising:
   providing first and second acoustic receiver means at said first and second reference points, respectively, for generating respective acknowledgment signals when said receiver means detect an acoustic signal, said reference points being fixedly located with respect to said vessel beneath the water surface;
   securing a plurality of acoustic transmitter means to said pipeline at spaced-apart points along the length thereof for transmitting respective acoustic signals responsive to receipt of a triggering signal;
   providing a common information link between said vessel and each of said transmitter means such that such triggering signal may be conveyed to said transmitter means from said vessel, said information link being an electrical conductor extending between said vessel and all of said transmitter means
   providing a first triggering signal to said information link thereby causing simultaneous transmission of acoustic signals from all of said transmitter means;
   measuring the elapsed times from said first triggering signal to detection of said acoustic signals by said first receiver means;

calculating the distances from said first receiver means to each of said transmitter means corresponding to each of said elapsed time measurements;

providing a second triggering signal to said information link thereby causing simultaneous transmission of acoustic signals from all of said transmitter means;

measuring the elapsed times from said second triggering signal to detection of said acoustic signals by said second receiver means;

calculating the distances from said second receiver means to each of said transmitter means corresponding to each of said elapsed time measurement; and processing said distance calculations to provide a visual indication of the position of said pipeline with respect to said reference plane.

9. The method of claim 8 further including the step of analyzing the characteristics of said acoustic signal at said first and second acoustic receiver means such that said receiver means generate an acknowledgment signal only in response to acoustic signals having predefined characteristics.

10. The method of claim 9 wherein said predefined characteristic is an increase in amplitude of said acoustic signal within a predetermined period of time.

11. The method of claim 8 further including the further step of disabling each receiver means for a predetermined period after it generates an acknowledgment signal whereby the receiver means is incapable of responding to delayed acoustic signals.

12. The method of claim 8 wherein said step of processing said distance measurements includes the step of modifying distance measurements to compensate for the relative motion between said vessel and said pipeline such that said pipeline profile is stationary with respect to a fixed plane of reference.

13. The method of claim 8 wherein said pipeline is surrounded by a coating and said electrical conductor extends along said pipeline beneath the outer surface of said coating.

14. The method of claim 13 further including the steps of securing a plurality of overlapping conductors staggered along the length of said pipeline to function one at a time as one of said pair of conductors and connecting the overlapped portions of said staggered conductors to those transmitter means located at the overlap, thereby preventing triggering signals transmitted from said vessel from reaching transmitter means located a distance from the vessel greater than the length of the adjoining staggered conductor.

15. A method for determining the profile of an underwater pipeline extending from a pipe laying vessel to an ocean floor, said method comprising;

providing first, second and third acoustic transmitter means for selectively transmitting respective acoustic signals, said transmitter means being secured to said vessel at spaced apart non-aligned points thereof beneath the water surface;

securing a plurality of acoustic receiver means to said pipeline at spaced apart points along the length thereof for generating respective acknowledgment signals responsive to detection of said acoustic signal by each of said receiver means;

providing an information link means between said receiver means and said vessel for conveying said acknowledgment signals signals from said receivers to said vessel;

actuating said first transmitting means;

measuring the elapsed times from transmission of said acoustic signal from said first transmitter means to detection of acknowledgment signals at said vessel through said information link;

calculating the distance from said first transmitter means to each of said receiver means corresponding to each of said elapsed time measurements;

actuating said second transmitter means;

measuring the elapsed times from transmission of said acoustic signal from said second transmitter means to detection of acknowledgment signals at said vessel through said information link;

calculating the distance from said second transmitter means to each of said receiver means corresponding to each of said elapsed time measurements;

actuating said third transmitter means;

measuring the elapsed times from transmission of said acoustic signals from said third transmitter means to detection of acknowledgment signals at said vessel through said information link;

calculating the distance from said third transmitter means to each of said receiver means corresponding to each of said elapsed time measurements; and processing said distance calculations to provide a visual indication of the profile of said pipeline in two planes of reference.

16. The method of claim 15 wherein said first and second acoustic transmitter means are located at equal distances beneath the water line and said third transmitter means is located beneath said first and second transmitter means, and wherein the first of said planes of reference is a horizontal plane intersecting said first and second transmitter means and the other of said planes of reference is a vertical plane intersecting said third transmitter means.

17. An apparatus for providing an indication of the position of an underwater pipeline extending from a pipe laying vessel to an ocean floor with respect to a reference plane equidistant from first and second spaced-apart reference points, said apparatus comprising:

first and second acoustic transmitter means at said first and second reference points, respectively, for selectively transmitting respective acoustic signals, said reference points being fixedly located with respect to said vessel beneath the water surface;

a plurality of acoustic receiver means secured to said pipeline at spaced-apart points along the length thereof for generating respective acknowledgment signals when each of said receiver means detect such an acoustic signal;

a common information link between said receiver means and said vessel for conveying said acknowledgment signals from said receiver means to said vessel, said information link being an electrical conductor extending between said vessel and all of said receiver means;

timer means for measuring the elapsed times between transmission of said acoustic signals from said first and second transmitter means and receipt of each acknowledgment signal through said information link;

a central processor for converting said elapsed time measurements to distance measurements corresponding to the distance between said first and second transmitter means and each of said receiver means; and display means operatively associated with said central processor for providing a visual indication of the position of said pipeline with respect to said reference plane.

18. The apparatus of claim 17 wherein said receiver means comprise:
a transducer for generating an electrical signal responsive to said acoustic signal;
an amplifier receiving the output of said transducer;
a signal discriminator connected to the output of said amplifier, said discriminator including means for producing an acknowledgment signal responsive to said acoustic signals only when said signal discriminator receives an acoustic signal having a predefined characteristic; and
lock-out means for inhibiting said signal discriminator from producing an acknowledgment signal responsive to receipt of an acoustic signal having said predefined characteristic for a predetermined period subsequent to each acknowledgment signal.

19. The apparatus of claim 18 wherein said predefined characteristic is an increase in amplitude of said acoustic signal within a predetermined period of time.

20. The apparatus of claim 19 wherein said discriminator means comprise:
means for producing a noise level voltage corresponding to the noise level at a point along the signal path of said receiver means;
means for comparing said amplified signal to said noise level and generating a first threshold signal when said amplified signal exceeds said noise level voltage by a first quantity, and generating a second threshold signal when said amplified signal exceeds said noise level voltage by a second quantity, said second quantity being greater than said first quantity;
signal analyzing means for detecting the presence of said second threshold signal at a predetermined time after initiation of said first threshold signal; and
means responsive to said signal analyzing means for causing an acknowledgment signal upon detection of said second threshold signal at said predetermined time.

21. The apparatus of claim 18 wherein said lock-out means comprise:
timer means for generating a lock-out signal for a predetermined period after each acknowledgment signal;
a signal gate disposed in said signal path for selectively passing said amplified signal to said discriminator, said gate being operatively connected to said timer means so that said discriminator means in unable to receive said amplified signal for a predetermined period after each acknowledgment signal.

22. The apparatus of claim 17 wherein said pipeline is surrounded by a coating and said electrical conductor extends along said pipeline beneath the outer surface of said coating.

23. An apparatus for providing an indication of the position of an underwater pipeline extending from a pipe laying vessel to an ocean floor with respect to a reference plane equidistant from first and second spaced apart reference points, said apparatus comprising:
first and second acoustic receiver means at said first and second reference points, respectively, for generating respective acknowledgment signals upon detection of an acoustic signal, said reference points being fixedly located with respect to said vessel beneath the water surface;
a plurality of acoustic transmitter means secured to said pipeline at spaced-apart points along the length thereof for transmitting an acoustic signal responsive to receipt of a triggering signal;
a common information link between said vessel and each of said transmitter means such that said triggering signal may be simultaneously conveyed to said transmitter means from said vessel, said information link being an electrical conductor extending between said vessel and all of said transmitter means
timer means for measuring the elapsed times between transmission of said triggering signals through said information link and detection of said acoustic signals by said receiver means at said vessel;
a central processor for converting said elapsed time measurements to distance measurements corresponding to the distance between said first and second receiver means and each of said transmitter means; and
display means operatively associated with said central processor for providing a visual indication of the position of said pipeline with respect to said reference plane.

24. The apparatus of claim 23 wherein said receiver means comprise:
a transducer for generating an electrical signal responsive to said acoustic signal;
an amplifier receiving the output of said transducer;
a signal discriminator connected to the output of said amplifier, said discriminator including means for producing an acknowledgment signal responsive to said acoustic signals only when said signal discriminator receives an acoustic signal having a predefined characteristic; and
lock-out means for inhibiting said signal discriminator from producing an acknowledgment signal responsive to receipt of an acoustic signal having said predefined characteristic for a predetermined period subsequent to each acknowledgment signal.

25. An apparatus for determining the profile of an underwater pipeline extending from a pipe laying vessel to an ocean floor, said apparatus comprising:
first, second and third acoustic transmitter means for selectively transmitting respective acoustic signals, said transmitter means being secured to said vessel at spaced apart, nonaligned points thereof beneath the water surface;
a plurality of acoustic receiver means secured to said pipeline at spaced apart points along the length thereof for generating respective acknowledgment signals responsive to detection of such acoustic signals by each of said receivers;
an information link means between said receiver means and said vessel for conveying said acknowledgment signals from said receiver means to said vessel;
timer means for measuring the elapsed times between transmission of said acoustic signal from said first, second and third transmitter means and receipt of each acknowledgment signal at said vessel through said information link means;
a central processor for converting said elapsed time measurements to distance measurements corresponding to the distance between said first, second and third transmitter means and each of said receiver means; and display means operatively associated with said central processor for providing a visual indication of the pipeline profile in two planes of reference.

26. The apparatus of claim 25 wherein said first and second acoustic transmitter means are located at equal distances beneath the water line and said third transmitter means is located beneath said first and second transmitter means, and wherein the first of said planes of reference is a horizontal plane intersecting said first and second transmitter means and the other of said planes of reference is a vertical plane intersecting said third transmitter means.

27. An apparatus for determining the profile of an underwater pipeline extending from a pipe laying vessel to an ocean floor, said apparatus comprising:

first, second and third acoustic receiver means for generating respective acknowledgment signals when said receiver means detect an acoustic signal, said receiver means being secured to said vessel at spaced apart, non-aligned points thereof beneath the water surface;

a plurality of acoustic transmitter means secured to said pipeline at spaced apart points along the length thereof for transmitting respective acoustic signals responsive to receipt of a triggering signal;

an information link means between said transmitter means and said vessel for conveying said triggering signals from said vessel to said transmitter means;

timer means for measuring the elapsed times between transmission of said triggering signals through said information link and detection of said acoustic signals by said receiver means at said vessel;

a central processor for converting said elapsed time measurements to distance measurements corresponding to the distance between said first, second and third transmitter means and each of said receiver means; and display means operatively associated with said central processor for providing a visual indication of the pipeline profile in two planes of reference.

* * * * *